US012664972B2

(12) United States Patent
Aggarwal et al.

(10) Patent No.: US 12,664,972 B2
(45) Date of Patent: *Jun. 23, 2026

(54) MODEL-AGNOSTIC VISUALIZATIONS USING LINEAR PROGRAMMING APPROXIMATION

(71) Applicant: Verint Americas Inc., Alpharetta, GA (US)

(72) Inventors: Abhinav Aggarwal, Albuquerque, NM (US); Ian Roy Beaver, Spokane, WA (US); Cynthia Freeman, Albuquerque, NM (US); Jonathan Patrick Merriman, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 860 days.

This patent is subject to a terminal disclaimer.

(21) Appl. No.: 17/389,839

(22) Filed: Jul. 30, 2021

(65) Prior Publication Data

US 2021/0358478 A1    Nov. 18, 2021

Related U.S. Application Data

(63) Continuation-in-part of application No. 16/356,091, filed on Mar. 18, 2019, now Pat. No. 11,080,489.

(60) Provisional application No. 62/645,112, filed on Mar. 19, 2018.

(51) Int. Cl.
| | |
|---|---|
| *G10L 15/06* | (2013.01) |
| *G06F 40/35* | (2020.01) |
| *G10L 15/01* | (2013.01) |
| *G10L 15/22* | (2006.01) |

(52) U.S. Cl.
CPC ............ *G10L 15/063* (2013.01); *G06F 40/35* (2020.01); *G10L 15/01* (2013.01); *G10L 15/22* (2013.01); *G10L 2015/0635* (2013.01); *G10L 2015/0638* (2013.01); *G10L 2015/225* (2013.01)

(58) Field of Classification Search
USPC ............................................... 704/7–10, 257
See application file for complete search history.

(56) References Cited

U.S. PATENT DOCUMENTS

| | | | |
|---|---|---|---|
| 5,730,603 | A | 3/1998 | Harless |
| 5,761,687 | A | 6/1998 | Hon et al. |
| 5,918,222 | A | 6/1999 | Fukui et al. |
| 5,999,904 | A | 12/1999 | Brown et al. |
| 6,097,442 | A | 8/2000 | Rumreich et al. |

(Continued)

OTHER PUBLICATIONS

Ballantyne, D., "Dialogue and its role in the development of relationship specific knowledge," Journal of Business & Industrial Marketing, vol. 19, No. 2, 2004, pp. 114-123.

(Continued)

*Primary Examiner* — Leonard Saint-Cyr

(74) *Attorney, Agent, or Firm* — Meunier Carlin & Curfman LLC

(57) ABSTRACT

A method of determining influence of language elements in script to an overall classification of the script by perturbing the dataset representing a conversation. In some instances, for example, in the conversation, the language elements and turns within the conversation (e.g., in a chat bot) are analyzed for their influence in escalation or non-escalation of the conversation to a higher level of resolution, e.g., to a human representative or manager.

14 Claims, 4 Drawing Sheets

(56) References Cited

U.S. PATENT DOCUMENTS

| | | | |
|---|---|---|---|
| 6,305,942 B1 | 10/2001 | Block et al. | |
| 6,556,970 B1 | 4/2003 | Sasaki et al. | |
| 6,847,931 B2 | 1/2005 | Addison et al. | |
| 6,925,455 B2 | 8/2005 | Gong et al. | |
| 7,149,687 B1 | 12/2006 | Gorin et al. | |
| 7,155,391 B2 | 12/2006 | Taylor | |
| 7,487,094 B1 | 2/2009 | Konig et al. | |
| 7,590,224 B1 | 9/2009 | Gorin et al. | |
| 8,086,462 B1 | 12/2011 | Alonso et al. | |
| 8,086,549 B2 | 12/2011 | Qi et al. | |
| 8,311,863 B1 | 11/2012 | Kemp | |
| 8,340,971 B1 | 12/2012 | Abella et al. | |
| 8,543,398 B1 | 9/2013 | Strope et al. | |
| 8,554,559 B1 | 10/2013 | Aleksic et al. | |
| 8,571,859 B1 | 10/2013 | Aleksic et al. | |
| 8,600,747 B2 | 12/2013 | Abella et al. | |
| 8,605,885 B1 | 12/2013 | Wooters | |
| 8,677,377 B2 | 3/2014 | Cheyer et al. | |
| 8,805,684 B1 | 8/2014 | Aleksic et al. | |
| 8,843,372 B1 | 9/2014 | Isenberg | |
| 8,880,398 B1 | 11/2014 | Aleksic et al. | |
| 9,054,909 B2 | 6/2015 | Shtiegman et al. | |
| 9,076,231 B1* | 7/2015 | Hill | G06F 21/84 |
| 9,123,333 B2 | 9/2015 | Amarilli et al. | |
| 9,202,461 B2 | 12/2015 | Biadsy et al. | |
| 9,460,722 B2 | 10/2016 | Sidi et al. | |
| 9,503,579 B2 | 11/2016 | Watson et al. | |
| 9,508,346 B2 | 11/2016 | Achituv | |
| 9,563,622 B1 | 2/2017 | Anderson | |
| 9,715,875 B2 | 7/2017 | Piernot et al. | |
| 10,170,116 B1 | 1/2019 | Kelly et al. | |
| 10,623,451 B2 | 4/2020 | Rathod | |
| 10,909,124 B2 | 2/2021 | Lim et al. | |
| 2001/0049688 A1* | 12/2001 | Fratkina | G06N 5/042 |
| 2002/0062342 A1 | 5/2002 | Sidles | |
| 2002/0152262 A1 | 10/2002 | Arkin et al. | |
| 2003/0046123 A1 | 3/2003 | Chen | |
| 2003/0055640 A1 | 3/2003 | Burshtein et al. | |
| 2003/0115056 A1 | 6/2003 | Gusler et al. | |
| 2003/0167195 A1 | 9/2003 | Fernandes et al. | |
| 2003/0191627 A1 | 10/2003 | Au | |
| 2004/0249650 A1 | 12/2004 | Freedman et al. | |
| 2004/0264677 A1 | 12/2004 | Horvitz et al. | |
| 2005/0060574 A1 | 3/2005 | Klotz et al. | |
| 2005/0080628 A1 | 4/2005 | Kuperstein | |
| 2005/0097507 A1 | 5/2005 | White et al. | |
| 2005/0105712 A1 | 5/2005 | Williams et al. | |
| 2005/0117729 A1 | 6/2005 | Reding et al. | |
| 2006/0080130 A1 | 4/2006 | Choksi | |
| 2006/0200759 A1* | 9/2006 | Agrawala | G06F 40/103 |
| | | | 715/209 |
| 2007/0005369 A1 | 1/2007 | Potter | |
| 2007/0011012 A1 | 1/2007 | Yurick et al. | |
| 2007/0071212 A1 | 3/2007 | Quittek et al. | |
| 2007/0100790 A1 | 5/2007 | Cheyer et al. | |
| 2008/0012701 A1 | 1/2008 | Kass et al. | |
| 2008/0086690 A1 | 4/2008 | Verma et al. | |
| 2008/0091423 A1 | 4/2008 | Roy et al. | |
| 2008/0221882 A1 | 9/2008 | Bundock et al. | |
| 2008/0240374 A1 | 10/2008 | Conway et al. | |
| 2008/0252780 A1 | 10/2008 | Polumbus et al. | |
| 2009/0012970 A1 | 1/2009 | Ziv et al. | |
| 2009/0103709 A1 | 4/2009 | Conway et al. | |
| 2009/0193011 A1 | 7/2009 | Blair-Goldensohn et al. | |
| 2009/0193328 A1 | 7/2009 | Reis et al. | |
| 2009/0222395 A1 | 9/2009 | Light et al. | |
| 2009/0224867 A1 | 9/2009 | O'Shaughnessy | |
| 2009/0240652 A1 | 9/2009 | Su et al. | |
| 2009/0290689 A1 | 11/2009 | Watanabe et al. | |
| 2010/0104087 A1 | 4/2010 | Byrd et al. | |
| 2010/0131274 A1 | 5/2010 | Stent et al. | |
| 2010/0332287 A1 | 12/2010 | Gates et al. | |
| 2011/0069822 A1 | 3/2011 | Jan et al. | |
| 2011/0206198 A1 | 8/2011 | Freedman et al. | |
| 2011/0267419 A1 | 11/2011 | Quinn et al. | |

| | | | |
|---|---|---|---|
| 2012/0239380 A1* | 9/2012 | Cumby | G06F 40/30 |
| | | | 704/E11.001 |
| 2012/0254917 A1 | 10/2012 | Burkitt et al. | |
| 2012/0310629 A1 | 12/2012 | Stewart et al. | |
| 2013/0018824 A1 | 1/2013 | Ghani et al. | |
| 2013/0103399 A1 | 4/2013 | Gammon | |
| 2013/0173254 A1 | 7/2013 | Alemi | |
| 2013/0282682 A1 | 10/2013 | Batraski et al. | |
| 2013/0297216 A1 | 11/2013 | Hirst et al. | |
| 2013/0300939 A1 | 11/2013 | Chou et al. | |
| 2014/0067375 A1 | 3/2014 | Wooters | |
| 2014/0074454 A1 | 3/2014 | Brown et al. | |
| 2014/0142940 A1 | 5/2014 | Ziv et al. | |
| 2014/0142944 A1 | 5/2014 | Ziv et al. | |
| 2014/0222419 A1 | 8/2014 | Romano et al. | |
| 2014/0222476 A1 | 8/2014 | Romano | |
| 2014/0297268 A1 | 10/2014 | Govrin et al. | |
| 2015/0025887 A1 | 1/2015 | Sidi et al. | |
| 2015/0066502 A1 | 3/2015 | Achituv et al. | |
| 2015/0066503 A1 | 3/2015 | Achituv et al. | |
| 2015/0112981 A1 | 4/2015 | Conti et al. | |
| 2015/0286627 A1 | 10/2015 | Chang et al. | |
| 2015/0348549 A1 | 12/2015 | Giuli et al. | |
| 2016/0071517 A1* | 3/2016 | Beaver | G06F 40/35 |
| | | | 704/9 |
| 2016/0217792 A1 | 7/2016 | Gorodetski et al. | |
| 2016/0217793 A1 | 7/2016 | Gorodetski et al. | |
| 2016/0350426 A1 | 12/2016 | Wu et al. | |
| 2017/0053653 A1 | 2/2017 | Sidi et al. | |
| 2017/0060996 A1 | 3/2017 | Das | |
| 2017/0068670 A1 | 3/2017 | Orr et al. | |
| 2017/0078485 A1 | 3/2017 | Czachor | |
| 2017/0160813 A1 | 6/2017 | Divakaran et al. | |
| 2017/0220677 A1 | 8/2017 | Kazi et al. | |
| 2017/0277993 A1* | 9/2017 | Beaver | G06Q 30/0201 |
| 2017/0359463 A1 | 12/2017 | Segalis et al. | |
| 2017/0359464 A1 | 12/2017 | Segalis et al. | |
| 2018/0025743 A1* | 1/2018 | Childress | G10L 15/26 |
| | | | 704/205 |
| 2018/0032874 A1* | 2/2018 | Sánchez Charles | G06N 7/01 |
| 2018/0052664 A1* | 2/2018 | Zhang | G06N 5/04 |
| 2018/0053119 A1* | 2/2018 | Zeng | H04M 3/5183 |
| 2018/0054464 A1* | 2/2018 | Zhang | H04L 51/02 |
| 2018/0054523 A1* | 2/2018 | Zhang | H04M 7/0045 |
| 2018/0060326 A1 | 3/2018 | Kuo et al. | |
| 2018/0101533 A1 | 4/2018 | Robichaud | |
| 2018/0114337 A1 | 4/2018 | Li et al. | |
| 2018/0226071 A1 | 8/2018 | Winter et al. | |
| 2018/0330721 A1 | 11/2018 | Thomson et al. | |
| 2019/0103102 A1 | 4/2019 | Tseretopoulos et al. | |
| 2019/0258700 A1* | 8/2019 | Beaver | G06N 3/08 |
| 2019/0354594 A1 | 11/2019 | Foster et al. | |

OTHER PUBLICATIONS

Beaver, I., et al., "An Annotated Corpus of Relational Strategies in Customer Service," arXiv.org, Cornell University Library, XP080953431, 2017, 19 pages.

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

Bickmore, T., et al., "Relational Agents: A Model and Implementation of Building User Trust," Proceedings of the SIGCHI Conference on Human Factors in Computing Systems (CHI '01), ACM, 2001, pp. 396-403.

Burge, J., Emojipedia, retrieved on Nov. 12, 2019 from https://blog. emojipedia.org/author/jeremyburge.com, 2013, 2 pages.

Casale, S., et al., "Speech Emotion Classification using Machine Learning Algorithms," The International Conference on Semantic Computing, IEEE Computer Society, 2008, pp. 158-165.

Chai, J.Y., et al., "Towards Conversational QA: Automatic Identification of Problematic Situations and User Intent," Proceedings of the COLING/ACL 2006 Main Conference Poster Sessions, Association for Computational Linguistics, 2006, pp. 57-64.

(56)         References Cited

OTHER PUBLICATIONS

Coppola, N.W. et al., "Building Trust in Virtual Teams," IEEE Transactions on Professional Communication, vol. 47, No. 2, 2004, pp. 95-104.

De Visser, E.J., et al., "Almost Human: Anthropomorphism Increases Trust Resilience in Cognitive Agents," Journal of Experimental Psychology: Applied, 2016, 19 pages.

Farias, D.I.H., et al., "ValenTo: Sentiment Analysis of Fgurative Language Tweets with Irony and Sarcasm," Proceedings of the 9th International Workshop on Semantic Evaluation, 2015, pp. 694-698.

Felbo, B., et al., "Using millions of emoji occurrences to learn any-domain representations for detecting sentiment, emotion and sarcasm," Proceedings of the 2017 Conference on Empirical Methods in Natural Language Processing (EMNLP), 2017, 13 pages.

Holton, J.A., "Building trust and collaboration in a virtual team," Team Performance Management: An International Journal, vol. 7, Nos. 3 and 4, 2001, pp. 36-47.

Kim, S., et al., "Annotation and Detection of Conflict Escalation in Political Debates," Proc. Interspeech, 2013, pp. 1409-1413.

Kim, B., et al., "Two-stage multi-intent detection for spoken language understanding," Multimedia Tools and Applications, 2016, 14 pages.

Laflen, A., et al., "Okay, my rant is over: The language of emotion in computer-mediated communication," Computers and Composition, vol. 29, No. 4, 2012, pp. 296-308.

Lee, M.K., et al., "Receptionist or Information Kiosk: How Do People Talk With a Robot?," Proceedings of the 2010 ACM conference on Computer supported cooperative work, ACM, 2010, pp. 31-40.

Levenshtein, V.I., "Binary Codes Capable of Correcting Deletions, Insertions, and Reversals," Soviet Physics-Doklady, vol. 10, No. 8, 1966, pp. 707-710.

Levy, S., "Alexa, Tell Me Where You're Going Next," Backchannel. com, available online at https://backchannel.com/alexa-tell-me-where-youre-going-next-739c53ff10b3, 2016, 8 pages.

Loria, S., et al., "TextBlob: Simplified Text Processing," Release 0.15.2, retrieved on Nov. 12, 2019 at https://textblob.readthedocs. io/en/dev, 2014, 3 pages.

Sarikaya, R., et al., "An overview of end-to-end language understanding and dialog management for personal digital assistants," IEEE Workshop on Spoken Language Technology, 2016, pp. 391-397.

Shen, P., et al., "Automatic Speech Emotion Recognition Using Support Vector Machine," 2011 International Conference on Electronic and Mechanical Engineering and Information Technology (EMEIT 2011), vol. 1, 2011, pp. 1-538.

Ververidis, D., et al., "Emotional speech recognition: Resources, features, and methods," Speech Communication, vol. 48, 2016, pp. 1162-1181.

Viterbi, A.J., "Error Bounds for Convolutional Codes and an Asymptotically Optimum Decoding Algorithm," IEEE Transactions on Information Theory, vol. 13, No. 2, 1967, pp. 260-269.

Xu, P., et al., "Exploiting Shared Information for Multi-intent Natural Language Sentence Classification," InterSpeech, 2013, pp. 3785-3789.

Xu, H., et al., "Minimum Bayes Risk decoding and system combination based on a recursion for edit distance," Computer Speech & Language, vol. 25, Issue 4, 2011, pp. 802-828.

Notice of Allowance received Nov. 17, 2023, U.S. Appl. No. 17/516,147.

Final Office Action dated Apr. 21, 2023, U.S. Appl. No. 17/516,147.

Non-Final Office Action dated Jan. 5, 2023, U.S. Appl. No. 17/516,147.

* cited by examiner

_220_     _230_

| Sentence | User Turn Text | Importance |
|---|---|---|
| 1 | Can i take the silver pack-age off of my account | |
| 2 | Change service? | |
| 3 | Add or change my service? | |
| 4 | I want to remove existing Charter services | |
| 5 | Click here to talk to a live rep by chat | |

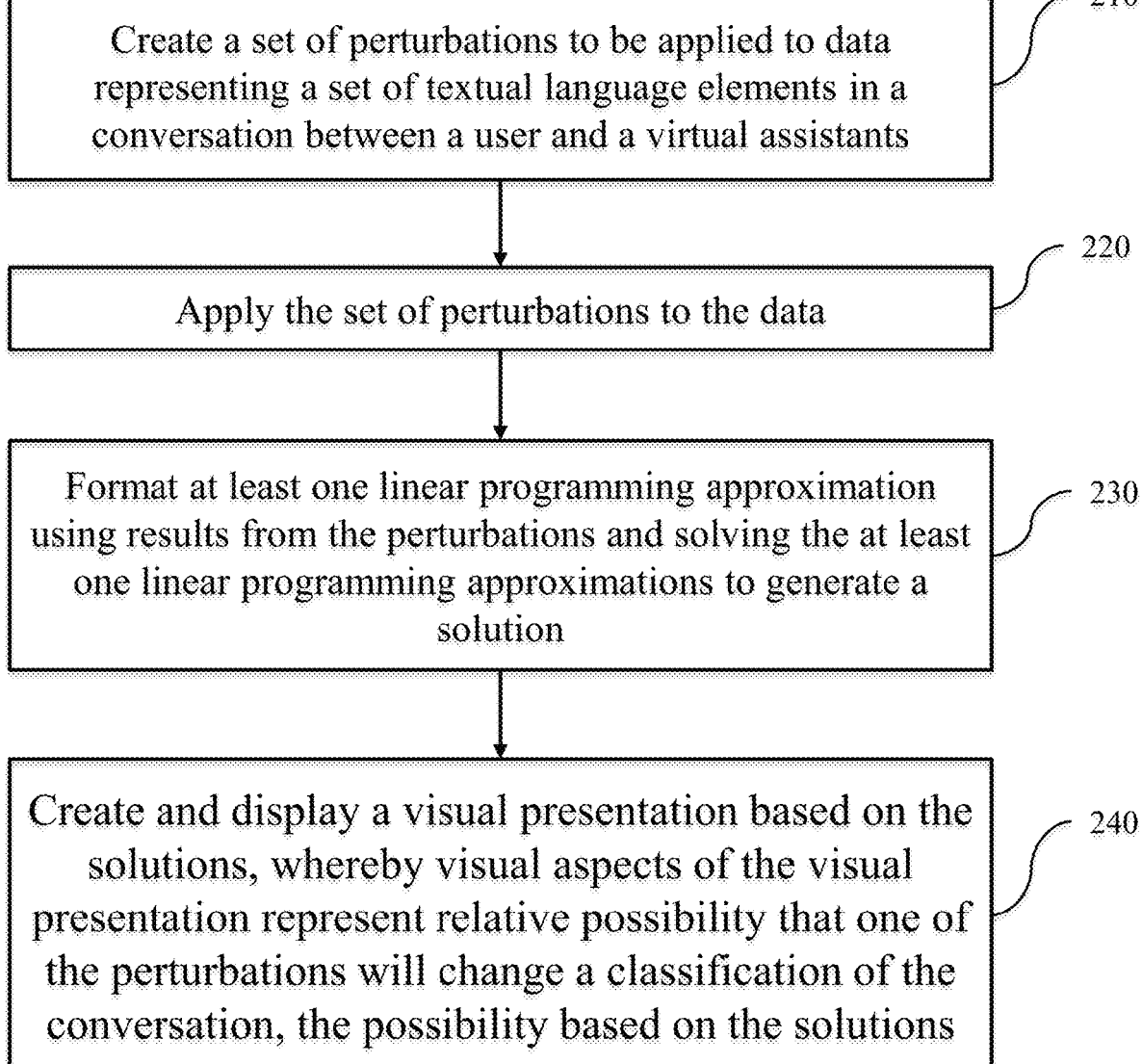

Create a set of perturbations to be applied to data representing a set of textual language elements in a conversation between a user and a virtual assistants — 210

Apply the set of perturbations to the data — 220

Format at least one linear programming approximation using results from the perturbations and solving the at least one linear programming approximations to generate a solution — 230

Create and display a visual presentation based on the solutions, whereby visual aspects of the visual presentation represent relative possibility that one of the perturbations will change a classification of the conversation, the possibility based on the solutions — 240

FIG. 4

MODEL-AGNOSTIC VISUALIZATIONS USING LINEAR PROGRAMMING APPROXIMATION

CROSS REFERENCE TO RELATED APPLICATIONS

This application is a continuation of U.S. application Ser. No. 16/356,091, filed Mar. 18, 2019, which claims priority to and benefit of U.S. Provisional Patent No. 62/645,112, filed Mar. 19, 2018, which applications are hereby incorporated by this reference in its entirety.

FIELD

Embodiments of the present invention relate to a method of visualizing decisions of a classifier, specifically model-agnostic visualizations using linear programming approximations.

BACKGROUND

With the rise of machine learning and especially deep learning, significant progress has been made in the fields of speech recognition, computer vision, and natural language processing. However, if data expresses a bias, the model will echo such biases. In addition, these models are black boxes; understanding the decisions these models make can be convoluted, leading to distrust. In applications such as self-driving cars or disease diagnosis, where a model's prediction can directly affect human lives, trust is vital. A model needs to not only be good, but interpretable. The interpretation of these black box models is a young field of research, and although progress has been made on visualizing the parts of inputs that contribute greatly to a classifier's decision, much future work is necessary.

BRIEF SUMMARY OF THE DISCLOSURE

Accordingly, the present invention is directed to a model-agnostic visualization using linear programming approximation that obviates one or more of the problems due to limitations and disadvantages of the related art.

In accordance with the purpose(s) of this invention, as embodied and broadly described herein, this invention, in one aspect, relates to a method comprising performing a perturbation of the language elements by removing a subset of the language elements; analyzing the resulting classification to determine if the removed subset of the language elements causes a change in classifier outcome; and reporting that the subset is important to the classification if there is a change in the classifier outcome.

In another aspect, the invention relates to computer readable medium storing instructions for performing a perturbation of the language elements by removing a subset of the language elements; analyzing the resulting classification to determine if the removed subset of the language elements causes a change in classifier outcome; and reporting that the subset is important to the classification if there is a change in the classifier outcome.

Another aspect comprises a visual representation of a classifier resulting from performing a perturbation of the language elements by removing a subset of the language elements; analyzing the resulting classification to determine if the removed subset of the language elements causes a change in classifier outcome; and reporting that the subset is important to the classification if there is a change in the classifier outcome.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the model-agnostic visualization using linear programming approximation, as well as the structure and operation of the various embodiments of the model-agnostic visualization using linear programming approximation, are described in detail below with reference to the accompanying drawings.

It is to be understood that both the foregoing general description and the following detailed description are exemplary and explanatory only and are not restrictive of the invention as claimed.

BRIEF DESCRIPTION OF THE DRAWINGS

The accompanying figures, which are incorporated herein and form part of the specification, illustrate model-agnostic visualization using linear programming approximation. Together with the description, the figures further serve to explain the principles of the model-agnostic visualization using linear programming approximation described herein and thereby enable a person skilled in the pertinent art to make and use the model-agnostic visualization using linear programming approximation.

FIG. 2 is a table illustrating a visual representation of an escalation analysis based on turns in a conversation.

FIG. 4 illustrates a flowchart representing a process of model-agnostic visualization using linear programming approximation.

DETAILED DESCRIPTION

Reference will now be made in detail to embodiments of the model-agnostic visualization using linear programming approximation.

Described herein is a new method to visualize the decisions of any classifier. Such visualizations can help build trust in the classifier and serve as a check on the biases of the data used. By carefully perturbing the input, classifier prediction probabilities are explained by creating multiple linear programming approximations (LPAs). The solutions of these LPAs determine the importance of textual elements (such as sentences in a document or turns in a conversation) pertaining to the classification task at hand. A metric that measures how faithful the visualization methodology is to the classifier is provided to illustrate how closely the visualization technique approximates the behavior of the classifier.

Figure 1:
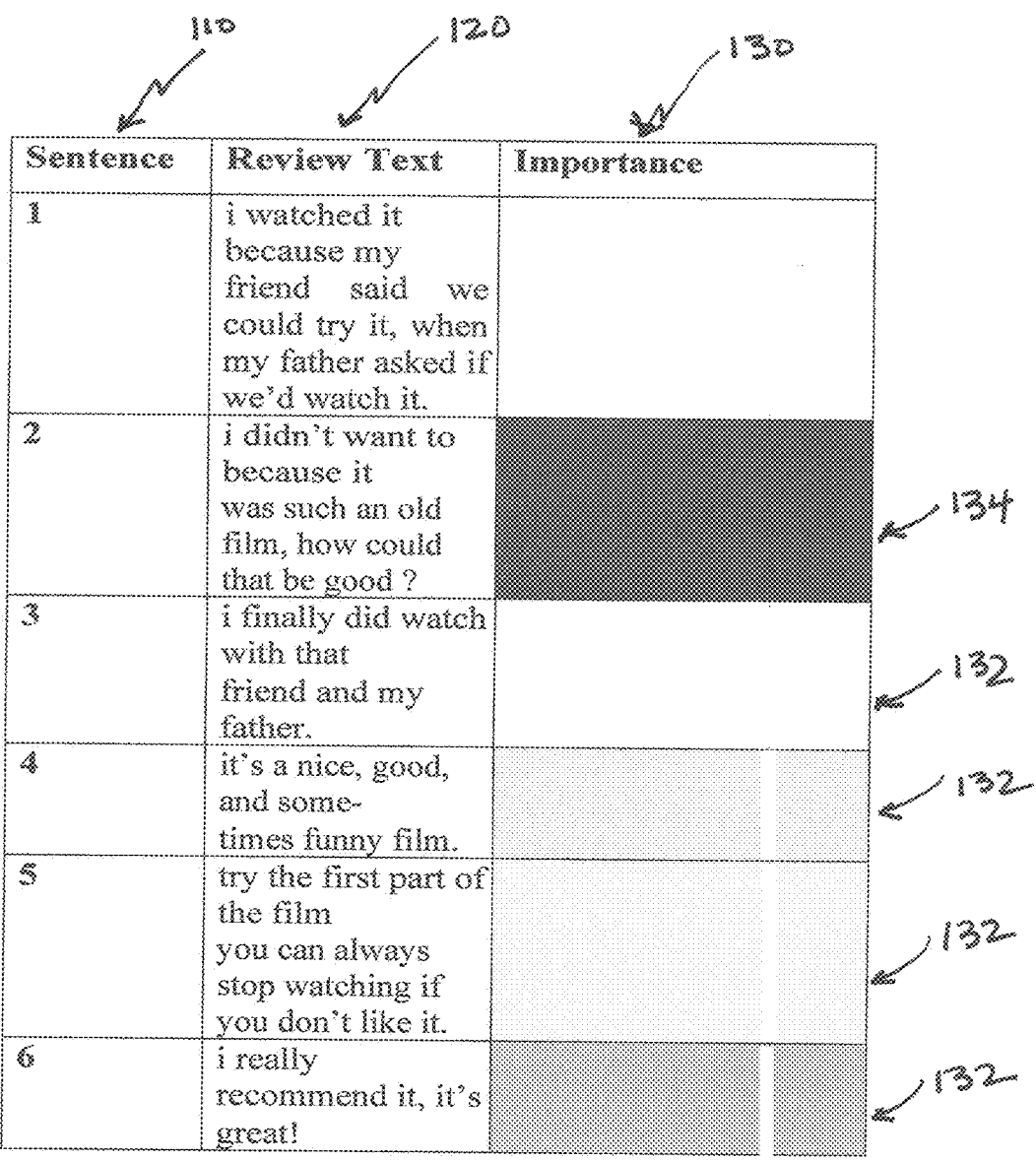
FIG. 1 is a table illustrating a visual representation of a sentiment analysis.
Figure 3:
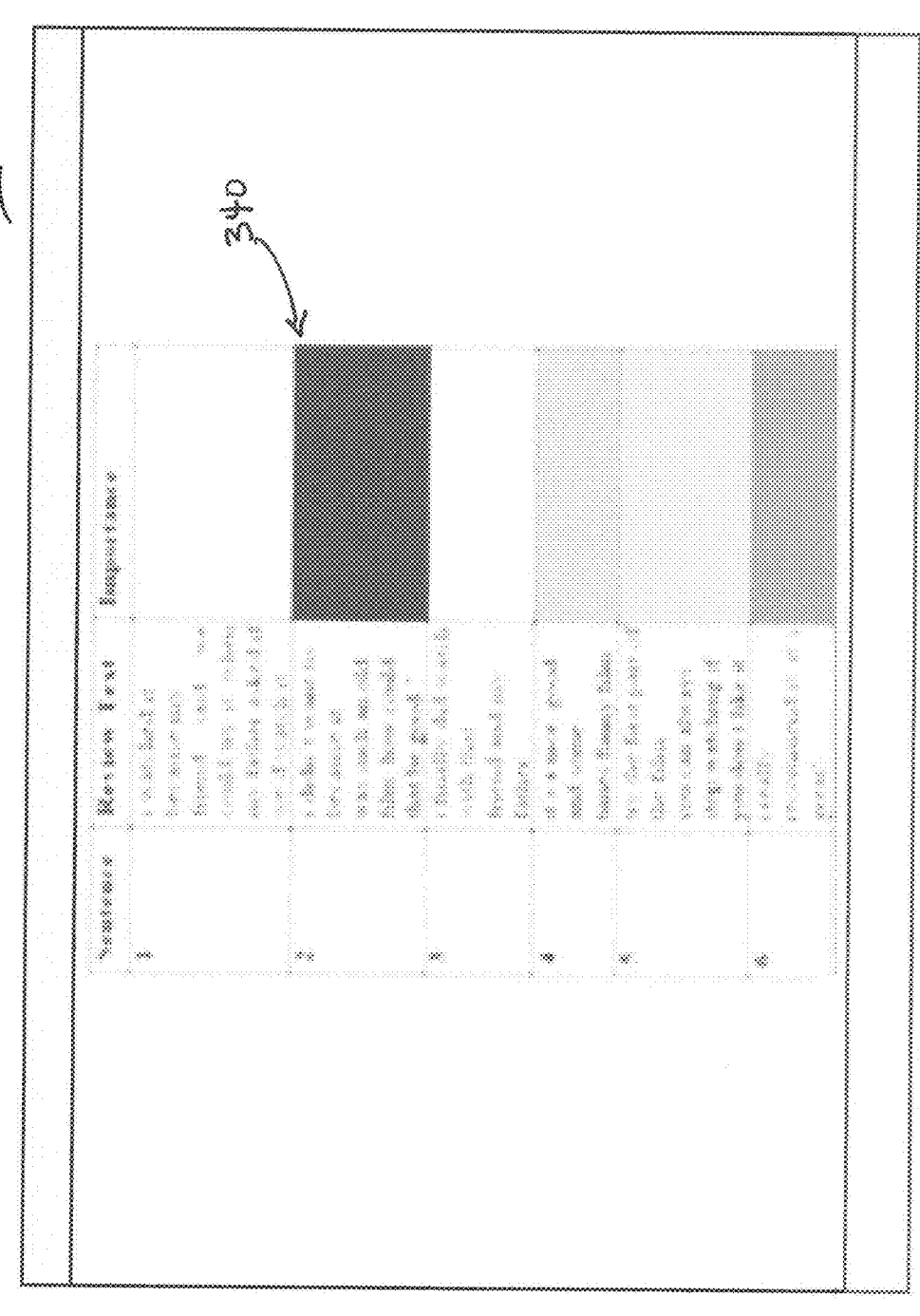
FIG. 3 illustrates a graphical user interface showing a table illustrating a visual representation according to principles described herein.

A method for visualizing a classifier's decisions using a linear programming approximation (LPA) approach is provided. Given a textual input, the classifier returns a prediction probability for the class. By perturbing the textual input, the importance of certain elements of the text can be determined by analyzing how much the prediction probabilities vary. For example, suppose a classifier is trained to determine if a movie review is positive or negative. The review can be perturbed (by removing one or more sentences) and seeing how probabilities for the classes of positive or negative review change. If a sentence such as "I hate this movie" is removed from the review, and the prediction probability for a negative review drastically drops, it can be determined that the influence of that particular sentence is great. The sentences 110 of the review 120 could then be highlighted by color intensity for their importances 130 in the classifier's decision, as illustrated in FIG. 1. FIG. 1 illustrates the influence of each sentence in a movie review on a classifier's decision on whether the review is positive (orange) 132 or negative (blue) 134. More influential sentences are darker in color. FIG. 3 illustrates a graphical user interface 300 showing a table illustrating a visual representation 340 according to principles described herein.

Such sentiment analysis provides an illustration of which phrases, clauses or sentences lead to the outcome, e.g., positive or negative. Phrases, clauses or sentences, e.g., sentiment analysis, are not the only delineation.

As another example, suppose a classifier is trained to determine if and when a conversation between a user and a chatbot should be escalated. An escalation occurs when the user is transferred to a human representative because the conversation between the user and the chatbot is failing to progress. In this case, the conversation can be perturbed to determine the importances of user turns in the conversation, instead of, e.g., sentences. Another interesting feature of conversational data is the presence of repetitions in user text. If a user repeats his request multiple times in a conversation, the chances for escalation should intuitively increase as the conversation is obviously not progressing. Thus, each repeated turn should increase in importance. However, if the visualization scheme treats each sample as independent, this information will be lost. Therefore, a visualization method that will highlight the samples most influential to the model in sequential data as well as not assuming independence of samples is desirable.

In addition to the visualization technique, provided is a measure of how accurately these visualizations are portraying the classifier's decisions. It is not only helpful to create visualizations, but also visualizations that are faithful to the classifier. If a visualization is not faithfully representing the classifier, this will not help in the task of building trust in the classifier. Thus, the present disclosure also considers a faithfulness metric and discusses how to calculate this value for every visualization created.

The following detailed description provides a discussion of the methodology of a technique according to principles described herein: (1) how perturbations are created; (2) how LPAs are formulated from these perturbations and solved (3) how the solutions of the LPAs are used to create visuals and (4) how faithful the application of the technique is to the classifier.

For differentiable models that produce a score or a probability for a class, partial derivatives with respect to the input features indicate each feature's relative influence on the classifier's output. This is useful if the input features of the model are already interpretable. For example, in image classification models whose inputs are pixels, the input and gradient can be presented simultaneously to a user, allowing the user to judge whether the model is making the expected associations.

Gradient-based explanations can be adapted to the case of non-differentiable or black-box models by approximating the classifier globally from a class of differentiable surrogates (Parzen windows, Gaussian processes). Using a surrogate model for explanation also opens up the possibility to choose an alternative feature basis that lends itself more readily to visual presentation.

Many open questions still exist, not just in developing new techniques for interpreting black box models, but also in adapting existing methods to work with various models and structures of data. For example, DeepLIFT assigns importance scores to inputs by comparing neuron activations to a reference activation that must be user chosen. DeepLIFT is not yet applicable to RNNs. Layerwise relevance propagation, inspired by backpropagation, can determine which features in an input vector contribute the most to a network's output, but was only very recently adapted to textual input and even more recently to LSTMs. Another method is attention, inspired by the principle that animals often focus on specific parts of visual input to determine adequate responses. Bandanau proposed a neural translation model using attention, translating text from one language to another. Attention can be used to highlight important words and sentences in text. Attention, however, like the other previously mentioned methods above, is not model-agnostic. LIME is model-agnostic, relying solely on the input data and classifier prediction probabilities. By perturbing the input and seeing how predictions change, one can approximate the complex model using a simpler, interpretable linear model. However, users must consider how the perturbations are created, which simple model to train, and what features to use in the simpler model. Anchors (by the same authors of LIME) is also model-agnostic, but instead of highlighting elements of text, creates "if-then" rules that apply.

Present Methodology

Let $\mathcal{C}$ be a conversation with N turns, which is represented by an ordered N-tuple: $\mathcal{C} = (T_1, \ldots, T_N)$. As we wish to consider repetitions in conversations, assume a similarity function $\text{SIM}(T_i, T_j)$ which returns 1 if turns Ti and Tj are the same turns, either semantically or structurally (user chosen), and 0 otherwise. The conversation may be perturbed by removing turns. Let $P \in \{0, 1\}^N$ be a perturbation of $\mathcal{C}$ such that $P[i] = 1$ if $Ti \in P$ (turn i is present in the perturbation). Note that the original conversation is also a trivial perturbation.

The similarity condition is extended for turns to perturbations. $\text{SIMP}(Pk, Pj)$ is 1 IFF the perturbations Pk and Pj have the same number of turns, and for each turn i, it is the case that $\text{SIM}(Pk[i], Pj[i]) = 1$.

Prediction probabilities are also considered in creating our visuals. Let $\text{CLASS}(P)$ be the output of the underlying classifier, denoted by $\text{CLASS}$, which is the probability by which $\text{CLASS}$ predicts that perturbation P should be escalated.

Define the (maximal) set of distinct perturbations $P_\mathcal{C}$ in the following manner: for every $P \in P_\mathcal{C}$, P belongs to $P_\mathcal{C}$ only if there does not exist any $P' \in P_\mathcal{C}$, such that $\text{SIMP}(P, P) = 1$. In other words, all perturbations of $\mathcal{C}$ in the set $P_\mathcal{C}$ are distinct with respect to the similarity function $\text{SIMP}$.

Creating LPAs:

How the Importances of Each Turn in a Conversation are Represented.

Given the conversation $\mathcal{C} = (T_1, \ldots, T_N)$, determine the weight $w_i > 0$ for each of the turns $T_i$ such that given any perturbation P of $\mathcal{C}$, the linear combination of the weights of the turns in P best approximates the probability of escalation ($\text{CLASS}(P)$).

In other words, turn weights $w = \{w_1, \ldots, w_N\}$ are found such that for each perturbation $P \in P_\mathcal{C}$, the linear combination as given by the dot product $w \cdot P^T$ best approximates $\text{CLASS}(P)$.

This can be formulated as the following optimization problem: minimize $\Sigma_{p \in P_C} |w \cdot P^T - \text{CLASS}(\overset{\mapsto}{P})|$, where the sum ranges over all distinct perturbations of C, subject to the condition that $w_i > 0$ for all turns $T_i$.

Note that other possible formulations exist. One could replace the absolute difference in the summation by squares to seek the minimum value of $\sum_{p \in P_C}(w \cdot P^T - \text{CLASS}(P))^2$. The advantage of this alternative is that it resembles the standard least-squares optimization problem. However, both techniques involve summation over (possibly) exponentially many perturbations, which can render it prohibitively slow for long conversations. As an example, a conversation with 10 turns (all distinct) can have as many as 1,023 (nonempty) perturbations. However, for smaller conversations, this method may not be as prohibitive as $|P_C| < 7N$ for $N \leq 5$.

Proceeding using the least squares optimization problem, more formally, given a conversation $C = (T_1, \ldots, T_N)$, compute weights $w_1, \ldots, w_N$ for the following problem:

$$\min_{w \in \{0,1\}^N} \sum_{P \in P_C} (w \cdot P^T - \text{CLASS}(P))^2$$

$$\text{s.t. } w_i \in (0, 1] \text{ for all } i \in \{1, ..., N\}.$$

In escalation, repetition is a very important feature, where if turns i and j are similar and i<j, we want $w_i < w_j$. This property implies that repetition favors escalation (users tend to clarify their request by repetition), which was empirically shown to be an important factor. This is enforced by adding some constraints to the optimization problem. This requirement can be captured by using recurrence-observant weight vectors.

Recurrence-observant weight vector: Let $C = (T_1, \ldots, T_N)$ be a conversation, w be the weights assigned to each turn in $C$ and SIM be a similarity function on the turns. Given an $\varepsilon > 0$, w is (SIM, $\varepsilon$)-recurrence-observant if for every $T_i$, $T_j \in C$ with i<j, SIM($T_i$, $T_j$)=1 implies $w_i \leq w_j - \varepsilon$.

If a turn is repeated in a conversation, then the weight of its later occurrence must be higher by at least $\varepsilon$. Given this property, a weight vector is sought that is recurrence-observant and minimizes the least squares sum as follows:

$$\min_{w \in \{0,1\}^N} \sum_{P \in P_C} (w \cdot P^T - \text{CLASS}(P))^2$$

$$\text{s.t. } w_i \in (0, 1] \text{ for all } i \in \{1, ..., N\}$$

and $w_i \leq w_j - \varepsilon$ for all $T_i, T_j \in C$ with i<j such that SIM($T_i$, $T_j$)=1.

Ideally, if w can be computed such that $w \cdot P^T = \text{CLASS}(P)$ for all perturbations, then there would be a perfect linear approximation. However, such a computation may not always be possible due to potential non-linearities in the underlying classifier (CLASS). Thus, the formulation can be relaxed, as follows:

$$\max_{w \in \{0,1\}^N} \|w\|_1 \qquad \text{(OBJ)}$$

$$\text{s.t. } w_i \in (0, 1] \; \forall \, i \in \{1, ..., N\} \qquad \text{(CON1)}$$

$$\text{and } w \cdot P^T \leq \text{CLASS}(P) \; \forall \, P \in P_C \qquad \text{(CON2)}$$

$$\text{and } w_i \leq w_j - \varepsilon \; \forall \, T_i, T_j \in C(i < j) \text{ s.t. } SIM(T_i, T_j) = 1 \qquad \text{(CON3)}$$

This is a linear program that approximates the solution to the least squares problem initially formulated, LPA (linear program approximation). The $L_i$-norm of the weight vector is maximized to avoid the trivial solution. This LPA can be solved using the Simplex Algorithm.

Note that another formulation is possible where instead of maximizing $\|w\|_1$ subject to $w \cdot P^T \leq \text{CLASS}(P)$ for all $P \in \mathbb{P}_C$ (approximation from below), $\|w\|_1$ is minimized subject to $w \cdot P^T \geq \text{CLASS}(P)$ for all $P \in \mathbb{P}_C$ (approximation from above). The former (maximization) is applied for the of this disclosure.

One can generate the constraints for the LPA as formulated above, as discussed below. Given the objective function OBJ, as above, observe that CON1 is as given and CON3 only requires a definition of the similarity function and E, both of which are user-chosen. However, for CON2, there can be exponentially many such constraints as it is determined by the perturbations considered. The other extreme (not adding any constraint from CON2) will prevent the LPA from producing any approximation to the classifier output at all as proven below.

Why CON2 is Necessary?

Lemma 5.1. For any turn $T_i$, let be the weight of the jth occurrence of $T_i$ as obtained from the LPA, where $j \in \{1, \ldots, a_i\}$. Then $w_i^j \leq 1 - (a_i - j)\varepsilon$.

Proof. For any fixed $j \in \{1, \ldots, a_i - j + 1\}$, from constraint CON3, it must be the case that $w_i^j \leq w_i^{j+1} - \varepsilon$. Similarly, $w_i^{j+1} \leq w_i^{j+2} - \varepsilon$. Substituting it in the previous equation, we get $w_i^j \leq w_i^{j+2} 2\varepsilon$. This can be easily seen to generalize to $w_i^j \leq w_i^{j+t} - t\varepsilon$ for $t \in \{1, \ldots, a_i - j\}$. Finally, using CON1, we know that $w_{a_i} \leq 1$. Thus, using this in the previous equation with $t = a_i - j$, we get $w_i^j \leq 1 - (a_i - j)\varepsilon$. $\square$ Lemma 5.2. Given an $\varepsilon > 0$, the maximum value of the objective function OBJ without any constraint from CON2 is at most $N(1 - 3\varepsilon/2)$ for any conversation containing N turns.

Proof. Without loss of generality, let $T_1, \ldots, T_n$ be distinct turns in $C$ (w.r.t. the similarity function SIM), and $a_1, \ldots, a_n$ be the frequencies for each of these turns. Thus, the total number of turns is given by $$N = \sum_{i=1}^{n} a_i.$$

Fix a turn $T_i$. Let $w_i^j$ be the weight of the jth occurrence of $T_i$. Then, from the previous Lemma, we know that $w_i^j \leq 1 - (a_i - j)\varepsilon$. Thus, the value of the objective function is $$\|w\|_1 \geq \sum_{i=1}^{n} \sum_{j=1}^{a_i} (1 - (a_i - j)\varepsilon) = N(1 - \varepsilon/2) - \varepsilon \sum_{i=1}^{n} a_i^2 / 2.$$

Now, since $$\sum_{i=1}^{n} a_i = N,$$

then $$\sum_{i=1}^{n} a_i^2 \geq N^2/n,$$

which gives $\|w\|_1 \leq N(1 - \varepsilon/2) - \varepsilon N^2/n$. Finally, since $n \leq N$, we have $N^2/n \geq N$, which gives $\|w\|_1 \leq N(1 - 3\varepsilon/2)$. $\square$ If $\varepsilon > \frac{2}{3}(1-p/N)$, where p=Class ($\mathcal{C}$) for a given N-turn conversation $\mathcal{C}$, then the weights will underapproximate the classifier's outcome. Moreover, for any $\delta \in (0, p)$, if $\varepsilon > \frac{2}{3}(1-(p-\delta)/N)$, then the weights under-approximate the classifier's outcome by $\delta$. Hence, the constraints from Con1 and Con3 are not sufficient by themselves for a good approximation.

Let us now examine how many and which constraints from Con2 should be added to the LPA for a better approximation. Recall that adding all constraints can be computationally very expensive and may even make the problem infeasible. Thus, an efficient algorithm to create perturbations is provided that, for the purposes addressed herein, produces constraints with a reasonably good approximation. The principles of the algorithm provided herein are illustrated using an example of a 4-turn conversation $\mathcal{C}$ =(A, B, B, D).

(1) Cumulative perturbations. For our example, we would include (1) A, (2) A, B, (3) A, B, B, and the original conversation (4) A, B, B, D.

(2) One-turn removal perturbations. This example includes (1) B, B, D, (2) A, B, D, and (3) A, B, B. Note that removing the second occurrence of B would create the same perturbation as removing the first occurrence of B. Thus, it is not included. If there are any duplicate perturbations from creating cumulative perturbations, they are removed.

(3) One-run removal. A run is defined as a continuous sequence of similar turns (as defined by the user-chosen Sim function). A run can be of length 1 or more. For this example, the following are included: B, B, D (removing the run with just A in it), A, D (removing the run with two B's in it), and A, B, B (removing the run with just D in it). Duplicates from the previous two steps are removed.

(4) Simultaneous-run removal. At this point if the number of unique perturbations created is greater than or equal to the number of turns present in the conversation, this step is not performed (enough constraints have been obtained to solve the LPA). If that is not the case, the following is performed. For each run, in the conversation, we randomly sample $r \in \{0, 1\}$ and $s \in \{1, \ldots, \alpha\}$, where $\alpha$ is the length of the run. If $\tau$ is 0, we remove the run completely. Else, if $\tau$ is 1, we keep s many turns from the run. We remove any duplicate perturbations from the previous three steps.

The output of some classifiers depends on the length of their inputs. For example, with an escalation classifier according to principles described herein, removing turns can drastically reduce the probability for escalation. The more turns a conversation has, the more likely an escalation occurs. In the dataset studied, conversations with 2 or fewer turns rarely escalate. Thus, perturbations must be created carefully to avoid the influence of the length of the perturbation (rather than its contents) on the weights of its constituent turns. LIME handles this by using a distance function that weighs perturbations that are farther away from the original sample less heavily to minimize such effects. According to principles described herein a perturbation length threshold $\tau$ is user-chosen. Any perturbation with fewer than $\tau$ many turns is removed to minimize the effect of perturbation length on turn weights. Note that this threshold may only be considered when the classifier is known to be sensitive to the length of its inputs. The movie reviews classifier is not input length dependent, and, thus, $\tau$ need not be considered when approximating the behavior of this classifier using the presently described LPA scheme.

The weights obtained from the max LPA can be interpreted as providing an estimate of the contribution of each turn to the probability of escalation as reported by the classifier. However, these weights reveal no information about how much a turn contributes to non-escalation. This allows interpretation of the weights as a basic belief assignment from the Dempster-Shafer theory of evidence, where the belief of an event happening may be different (and unrelated in some cases) to the belief of it not happening. To completely characterize the approximation and produce meaningful visualizations, a similar weight vector for the probability of non-escalation can be obtained. Hence, two LPAs—one for each class (escalation and non-escalation)—can be obtained and applied.

Denoting by 0 the class corresponding to non-escalation, and by 1 the class corresponding to escalation, let weights $$w_i^0 \text{ and } w_i^1$$

correspond to these two classes, respectively, for turn $T_i$ in the conversation C. Then solve two different instances of LPA, denoting them by $LPA_0$ and $LPA_1$, with the following changes:

(1) Replace all instances of $w_i$ with $$w_i^j$$

for $LPA_j$ (for $j \in \{0, 1\}$).

(2) For $LPA_0$, replace Con2 by $(w^0) \cdot P^T \le 1 - \text{Class}(P)$. For $LPA_1$, keep the constraint unchanged.

(3) One can choose different values for £ for the two LPs, if required. However, we suggest keeping it the same for a fair comparison.

Let the solution weight vectors to the two LPs be $w^{0*}$ and $w^{1*}$, respectively. For each turn $T_i$, we define $$v_i = \left(w_i^{1*} - w_i^{0*}\right)$$

to be the difference of the weights obtained by the two LPs. A positive value of $v_i$ indicates that the turn $T_i$ favors escalation of C, whereas a negative value suggests that the turn favors non-escalation. This is important for a direct comparison with the visualization provided by other approximation schemes like LIME [12], as LIME provides visualizations that show the contribution of textual elements for different classes. This is also indicative of the fact that in any given conversation, not all turns may contribute to escalation.

In our visualization, we use shades of orange 132/232 to denote a positive value of $v_i$ and shades of blue 134/234 otherwise. We normalize $v_i$ prior to assigning color intensities, by dividing all positive weights by the most positive weight (and similarly for negative weights). Example visualizations using our methodology are given in FIG. 1 (movie reviews) and FIG. 2 (escalation). FIG. 2 illustrates influence of each user turn 220 in a conversation on a classifier's decision (importance 230) on whether the conversation should escalate (orange) 232 or not escalate (blue) 234. More influential turns are darker in color.

A measure was proposed in conjunction to LIME, called the unfaithfulness parameter, is examined to estimate how unfaithful a given approximation is in the locality (defined using some user-chosen distance metric) of the given input to the classifier. For the present method, a slightly modified version of this parameter was applied to measure the quality of the approximation (and visualization) scheme as follows.

For a given perturbation $P \in \mathbf{P}_C$ and $\sigma > 0$ (we chose $\sigma = 25$), let the unfaithfulness for class 1 be defined as follows:

$$\mathcal{L}_p^1 = \pi c(P)\big(f^1(P) - g^1(P)\big)^2$$

where $\pi \mathcal{C}(P) = \exp(-\cos(P, C)^2/\sigma^2)$ and cos is the cosine distance between the interpretable vector representations of $P$ and $\mathcal{C}$ in $\{0, 1\}^N$. The classifier output $f^1(P) = \text{CLASS}(P) \in (0,1)$ is the probability of escalation and $g^1(P) = \Sigma_{T_i \in P} w_i^{1*}$ is the estimate of the probability of escalation of the perturbation $P$ as reported by the (optimal) solution $w^{1*}$ to $\text{LPA}_1$.

Similarly, let $$\mathcal{L}_p^0 = \pi_C(P)\big(f^0(P) - g^0(P)\big)^2$$

where $f^0(P) = 1 - \text{CLASS}(P) \in (0, 1)$ is the probability of non-escalation, and $g^0(P) = \Sigma_{T_i \in P} w0^*$ is the estimate of the probability of non-escalation of the perturbation $P$ as probability of non-escalation of the perturbation $P$ as reported by the (optimal) solution $w0^*$ to $\text{LPA}_0$. Let $P$ be the set of perturbations used as part of CON2 in solving $\text{LPA}_0$ and $\text{LPA}_1$ (note that the same set of perturbations is used for both LPAs). Then, we calculate the unfaithfulness $\mathcal{L}$ of our approximation scheme by the following equation:

$$\mathcal{L} = \sum_{P \in P} \min\big(\mathcal{L}_p^0, \mathcal{L}_p^1\big)$$

$$= \sum_{P \in P} e^{-con^2(P,C)/\sigma^2} \cdot \min \begin{cases} \big(\text{CLASS}(P) - \sum_{T_i \in P} w_i^{1*}\big)^2 \\ \big(1 - \text{CLASS}(P) - \sum_{T_i \in P} w_i^{0*}\big)^2 \end{cases}$$

Using the minimum to allow each perturbation to be treated as an independent conversation, the sum over all perturbations calculates how close the approximation was to the actual behavior of the classifier, regardless of whether the original conversation escalated or not. As previously mentioned, although progress has been made on visualizing the parts of inputs that contribute greatly to a classifier's decision, much future work is necessary.

Initial results show that it is possible to use the intuitive LPA approach for creating classifier visualizations, which can help the human representative quickly determine the cause of the escalation by scanning the conversation history and determining the best course of action based on problematic turns (identified by a visual cue, such as color or darker gray scale, e.g.). In addition to building trust for these classifiers, these visualizations can help developers determine ways of improving the classifiers themselves and find causes of escalation that can help improve the chatbots and reduce the need for escalation in the first place.

The above-described methodology can be adapted to other tasks such as movie reviews, where instead of perturbing turns, sentences are perturbed, and the prediction probability being considered is the probability of being a positive review.

FIG. 4 illustrates a flowchart representing a process of model-agnostic visualization using linear programming approximation. At 210, the process may include creating a set of perturbations to be applied to data representing a set of textual language elements in a conversation between a user and a virtual assistant. At 220, the process may also include applying the set of perturbations to the data. At 230, the process may further include formatting at least one linear programming approximation using results from the perturbations and solving the at least one linear programming approximations to generate a solution. At 240, the process may also include creating and displaying a visual presentation based on the solutions, whereby visual aspects of the visual presentation represent relative possibility that one of the perturbations will change a classification of the conversation, the possibility based on the solutions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Throughout this application, various publications may have been referenced. The disclosures of these publications in their entireties are hereby incorporated by reference into this application in order to more fully describe the state of the art to which this invention pertains.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. A method of visually presenting a representation of the effect of language elements on outcome of a conversation $C$ between a user and a virtual assistant to a representative, the method comprising:

generating a graphical user interface and displaying a conversation $C$ on the graphical user interface to the representative;

identifying a set of turns $T_1, \ldots, T_N$ corresponding to the conversation $C$;

creating a set of perturbations to be applied to data representing a set of textual language elements in conversation $C$ between a user and a virtual assistant, wherein the virtual assistant uses a large language model;

applying the set of perturbations to the data;

determining a weight $w_i > 0$ for each of the turns $T_i$ in the set of turns such that, given any perturbation $P$ from the set of perturbations, a linear combination of the weights of the turns affected by perturbation $P$ approximates a probability of escalation;

formulating a plurality of linear programming approximations using results from the perturbations and solving the plurality of linear programming approximations to generate solutions;

displaying on the graphical user interface a visual presentation to the representative based on the solutions and the probability of escalation, whereby visual aspects of the visual presentation represent relative possibility that one of the perturbations will change a classification of the conversation, the possibility based on the solutions, wherein the large language model was trained using one or more previous perturbations and solutions.

2. The method of claim 1, wherein, for each perturbation, a respective linear programming approximation takes the weights into account to approximate the classification of the conversation.

3. The method of claim 1, wherein the visual representation comprises a visual scale indicative of the importance of the textual language elements to the classifier outcome, the visual scale comprising a color indicator, wherein color and intensity of the color indicator reflects relative importance of the classifier outcome for each of the textual language elements.

4. The method of claim 1, wherein the visual representation takes into account relative weights of each perturbation.

5. One or more non-transitory computer-readable storage media storing computer-readable instructions that, when execute, instruct one or more processors to perform operations, comprising:

generating a graphical user interface and displaying a conversation $C$ on the graphical user interface to a representative;

identifying a set of turns $T_1, \ldots, T_N$ corresponding to the conversation $C$;

creating a set of perturbations to be applied to data representing a set of textual language elements in conversation $C$ between a user and a virtual assistant, wherein the virtual assistant uses a large language model;

applying the set of perturbations to the data;

determining a weight $w_i > 0$ for each of the turns Ti in the set of turns such that, given any perturbation P from the set of perturbations, a linear combination of the weights of the turns affected by perturbation P approximates a probability of escalation;

formulating a plurality of linear programming approximation using results from the perturbations and solving the plurality of linear programming approximations to generate solutions; and displaying on the graphical user interface a visual presentation to a representative based on the solutions and the probability of escalation, whereby visual aspects of the visual presentation represent relative possibility that one of the perturbations will change a classification of the conversation, the possibility based on the solutions, wherein the large language model was trained using one or more previous perturbations and solutions.

6. The one or more non-transitory computer-readable storage media of claim 5, wherein, for each perturbation, a respective linear programming approximation takes the weights into account to approximate the classification of the conversation.

7. The one or more non-transitory computer-readable storage media of claim 5, wherein the visual representation comprises a visual scale indicative of the importance of the textual language elements to the classifier outcome, the visual scale comprising a color indicator, wherein color and intensity of the color indicator reflects relative importance of the classifier outcome for each of the textual language elements.

8. The one or more non-transitory computer-readable storage media of claim 5, wherein the visual representation takes into account relative weights of each perturbation.

9. A method of identifying effect of language elements on an outcome of a conversation between a user and a virtual assistant, the method comprising, comprising:

generating a graphical user interface and displaying a conversation $C$ on the graphical user interface to the user;

for each turn Ti of the conversation $C=(T_1, \ldots, T_N)$ between the user and the virtual assistant, wherein the virtual assistant uses a large language model:

removing data representing the turn Ti from a conversation dataset representing the conversation to produce a perturbed dataset, the conversation having a plurality of dialogue turns and the conversation having a classification of escalation or non-escalation before removing the data;

applying a classifier to the perturbed dataset; and upon determining that the perturbed dataset has a different classification than the conversation dataset, displaying on the graphical interface a visual indication that the turn Ti represented by the removed data is important to an outcome of applying the classifier, wherein the large language model was trained using one or more previous perturbations and solutions.

10. The method of claim 9, the steps further comprising:

displaying on the graphical user interface a visual scale indicative of the importance of the turns represented by the removed data to outcome of applying the classifier.

11. The method of claim 10, the steps further comprising the visual scale comprising a color indicator, wherein color and intensity of the color indicator reflects relative importance of the classifier outcome for each of the turns.

12. A non-transitory computer-readable storage media having stored therein software executable to perform steps, comprising:

generating a graphical user interface and displaying a conversation $C$ between a user and a virtual assistant on the graphical user interface to the user, wherein the virtual assistant uses a large language model;

for each turn Ti of a conversation $C=(T_1, \ldots, T_N)$ between the user and the virtual assistant:

removing data representing the turn Ti from a conversation dataset representing the conversation to produce a perturbed dataset, the conversation having a plurality of dialogue turns and the conversation having a classification of escalation or non-escalation before removing the data;

applying a classifier to the perturbed dataset; and upon determining that the perturbed dataset has a different classification than the conversation dataset, displaying on the graphical interface a visual indication that the turn Ti represented by the removed data is important to an outcome of applying the classifier, wherein the large language model was trained using one or more previous perturbations and solutions.

13. The non-transitory computer-readable storage media of claim 12, the steps further comprising:

displaying on a graphical user interface a visual scale indicative of the importance of the turns represented by the removed data to outcome of applying the classifier.

14. The non-transitory computer-readable storage media of claim 13, the steps further comprising the visual scale comprising a color indicator, wherein color and intensity of the color indicator reflects relative importance of the classifier outcome for each of the turns.

\* \* \* \* \*